United States Patent
Baan

(10) Patent No.: US 6,236,181 B1
(45) Date of Patent: May 22, 2001

(54) SUPPLEMENTAL POWER CELL

(76) Inventor: William Shelton Baan, 11604 Park Rd., Charlotte, NC (US) 28226

( * ) Notice: Subject to any disclaimer, the term of this patent is extended or adjusted under 35 U.S.C. 154(b) by 0 days.

(21) Appl. No.: 09/338,389

(22) Filed: Jun. 22, 1999

(51) Int. Cl.$^7$ ...................................................... H02P 7/01
(52) U.S. Cl. .......................................... 318/500; 320/116
(58) Field of Search ............................ 318/16, 459, 500; 320/116, 117, 120

(56) References Cited

U.S. PATENT DOCUMENTS

| | | | |
|---|---|---|---|
| 4,131,833 | * 12/1978 | McAuliffe et al. | 318/440 |
| 5,015,545 | * 5/1991 | Brooks | 429/99 |
| 5,223,351 | * 6/1993 | Wruck | 429/9 |
| 5,233,282 | * 8/1993 | Iwashita | 320/7 |
| 5,422,558 | * 6/1995 | Stewart | 320/7 |
| 5,487,099 | * 1/1996 | Maekawa | 379/59 |
| 5,709,964 | * 1/1998 | Christensen et al. | 429/153 |

* cited by examiner

Primary Examiner—Bentsu Ro

(74) Attorney, Agent, or Firm—McGuireWoods LLP

(57) ABSTRACT

The present invention is a supplemental power cell that increases the top-end speed of an RC vehicle and that can be coupled to an existing RC vehicle power supply with minimal cost and effort to a hobby enthusiast. The supplemental power cell includes a rechargeable power cell, preferably a conventional rechargeable nickel cadmium battery, means for coupling the power cell between an RC vehicle power source and an RC vehicle motor and means for removably securing the supplemental power cell to an RC vehicle. The rechargeable power cell includes a cathode and an anode for conducting electrical current. The means for coupling includes a cathode lead connected to the cathode, an anode lead connected to the anode, a first connector that receives the cathode lead, a second connector that receives the anode lead and a tie lead for connecting the first connector to the second connector. The means for securing is preferably a hook and loop fastener having a first portion that is securable to a second portion. The first portion is fixed to the power cell housing and the second portion is fixed to the RC vehicle. In an alternative embodiment, the means for securing is a carriage for receiving and holding the power cell housing. The carriage may be affixed to the RC vehicle by an adhesive.

14 Claims, 5 Drawing Sheets

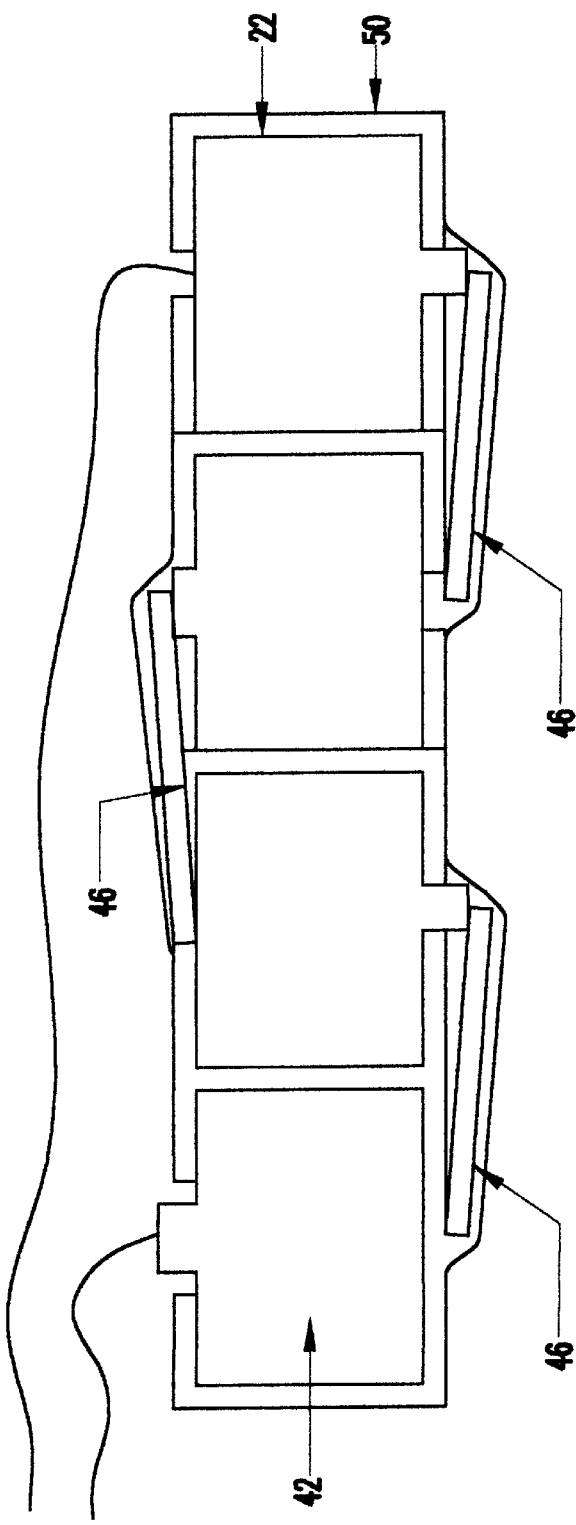
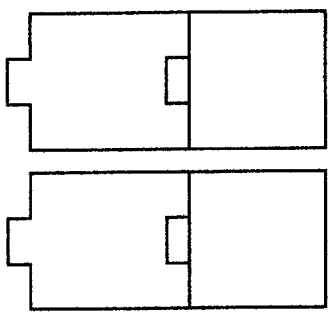
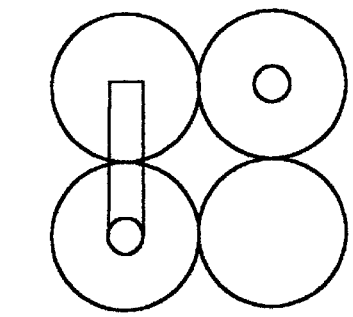
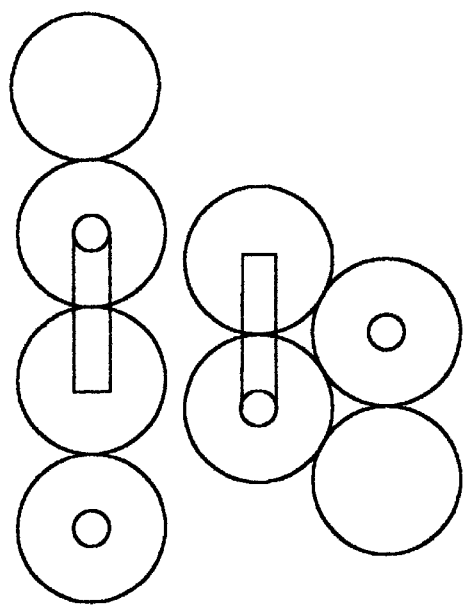

SUPPLEMENTAL POWER CELL

FIELD OF THE INVENTION

The present invention relates generally to electrical power cells for supplementing an electrical power source and, in particular, electrical power cells for coupling to a pre-existing electrical power source used in remote controlled devices.

BACKGROUND OF THE INVENTION

Remote controlled (RC) devices or vehicles such as RC cars, trucks, airplanes, helicopters and boats provide hobby enthusiasts, including both serious and casual participants, with an enjoyable form of entertainment and recreation. Many associations and clubs have developed in support of and to promote recreational and competitive RC vehicle racing.

A typical RC vehicle includes a motor that is powered by electricity, such as provided by a dry cell battery for example an alkaline battery or mercury battery or a rechargeable battery, such as a nickel-cadmium (NiCd) battery or Lithium (Li) battery or by combustible liquid fuel, such as provided by gasoline. In competitive RC vehicle racing or during recreational use of RC vehicles, the speed of the vehicle contributes to the overall excitement and entertainment derived from RC vehicle racing or recreational use. Consequently, RC vehicle manufacturers have designed RC vehicle motors and their corresponding power supplies to enable RC vehicles to travel at high rates of speed.

However, once a hobby enthusiast purchases an RC vehicle, the performance of the RC vehicle is limited by the original parts of the RC vehicle. To increase the upper limit of speed of the RC vehicle, the enthusiast can upgrade to a more powerful motor. Several problems arise with upgrading and outfitting an RC vehicle with a more powerful motor. One such problem is that an upgraded motor is typically more expensive than the cost of the original RC vehicle, and most enthusiasts initially spend a small fortune to purchase the RC vehicle. Another problem is that upgrading RC vehicle parts is generally a time-consuming task and requires an intimate knowledge of RC vehicle building. Most recreational RC vehicle users or purchasers of RC vehicles that are pre-assembled avoid RC vehicle building altogether.

Another problem with upgrading the motor or any other part of an RC vehicle is a limited availability of parts that fit the original RC vehicle. When manufacturing and designing RC vehicles, many factors are taken into account, including the weight tolerances of the vehicle frame, the availability of space on the RC vehicle for additional accessories, the maximum weight allowance of the assembled vehicle, the power requirements of the motor, the torque output requirement of the motor, and the compatibility between the power supply and the motor and other design characteristics specific to a particular RC vehicle application. For example, if the enthusiast desires to upgrade the RC vehicle motor, a replacement motor must be compatible with the power output of the power supply and, typically, must also fit within the space available with the vehicle for the original motor.

What is needed is a relatively inexpensive apparatus that increases the upper limit of speed of an RC vehicle and that requires only minimal effort for installation. Further needed is a supplemental power cell that increases the upper limit of speed of an RC vehicle and that can be coupled to an existing RC vehicle power supply with minimal cost and effort to the hobby enthusiast.

SUMMARY OF THE INVENTION

The invention is an apparatus that increases the upper limit of speed of an RC vehicle, which apparatus requires only minimal effort for installation. The invented apparatus is a supplemental power cell that increases the speed of an RC vehicle and that can be coupled to an existing RC vehicle power supply with minimal cost and effort to a hobby enthusiast.

In its basic form, the supplemental power cell includes a rechargeable power cell, preferably a conventional rechargeable nickel cadmium battery, or a plurality of nickel cadmium batteries, a coupling device for connecting the power cell between an RC vehicle power source and an RC vehicle motor and securing means for removably securing the supplemental power cell to an RC vehicle. The rechargeable power cell includes a cathode and an anode for conducting electrical current.

Each coupling device includes a cathode lead connected to the cathode, an anode lead connected to the anode, a first connector that receives the cathode lead, a second connector that receives the anode lead and a tie lead for connecting the first connector to the second connector. The securing means is preferably a hook and loop fastener having a first portion that is securable to a second portion. The first portion is fixed to the power cell housing and the second portion is fixed to the RC vehicle. In an alternative embodiment, the securing means is a carriage for receiving and holding the power cell housing. The carriage may be affixed to the RC vehicle by an adhesive.

The supplemental power cell can be secured to the RC vehicle by: cleaning the supplemental power cell and the location where the supplemental power cell will be secured to the RC vehicle with isopropyl alcohol; pealing the adhesive tape off the back of the hoop and loop fastener; affixing a single portion of either the hoop or loop fastener to the supplemental power cell and fastening the remaining portion to the RC vehicle; connecting the supplemental power cell leads to the RC vehicle leads; and, securing the power cell in place with the hook and loop fastener.

OBJECTS OF THE INVENTION

The principal object of the present invention is to provide an apparatus that increases the upper limit of speed of an RC vehicle with a minimal cost and effort to the enthusiast.

Another, object of the invention is to provide a supplemental power cell that increases the upper limit of speed of an RC vehicle and that can be coupled to an existing RC vehicle power supply with minimal cost and effort to the hobby enthusiast.

Another, object of the invention is to provide a supplemental power cell that increases the top-end speed of an RC vehicle, minimally modifies the original configuration of the RC vehicle and does not negatively interfere with the performance of the RC vehicle.

BRIEF DESCRIPTION OF THE DRAWINGS

The foregoing and other objects will become more readily apparent by referring to the following detailed description and the appended drawings in which:

FIG. 9 is an isometric view of a supplemental power cell in accordance with the present invention having four batteries showing full encapsulation.

FIG. 10 is a top view of a supplemental power cell in accordance with the present invention having four batteries side-by-side, full encapsulation not shown.

FIG. 11 is a top view of a supplemental power cell in accordance with the present invention having four batteries bunched together, full encapsulation not shown.

FIG. 12 is a top view of a supplemental power cell in accordance with the present invention having four batteries bunched together in an alternative configuration, full encapsulation not shown.

FIG. 13 is a side view of a supplemental power cell in accordance with the present invention having two batteries stacked on top of each other adjacent to two more batteries stacked on top of each other, full encapsulation not shown.

DETAILED DESCRIPTION

While the present invention is described in the context of a remote controlled (RC) car, the present invention is not intended to be limited to RC cars and may be applied to an RC truck, boat, plane, helicopter or other RC device or vehicle.

Figure 1:
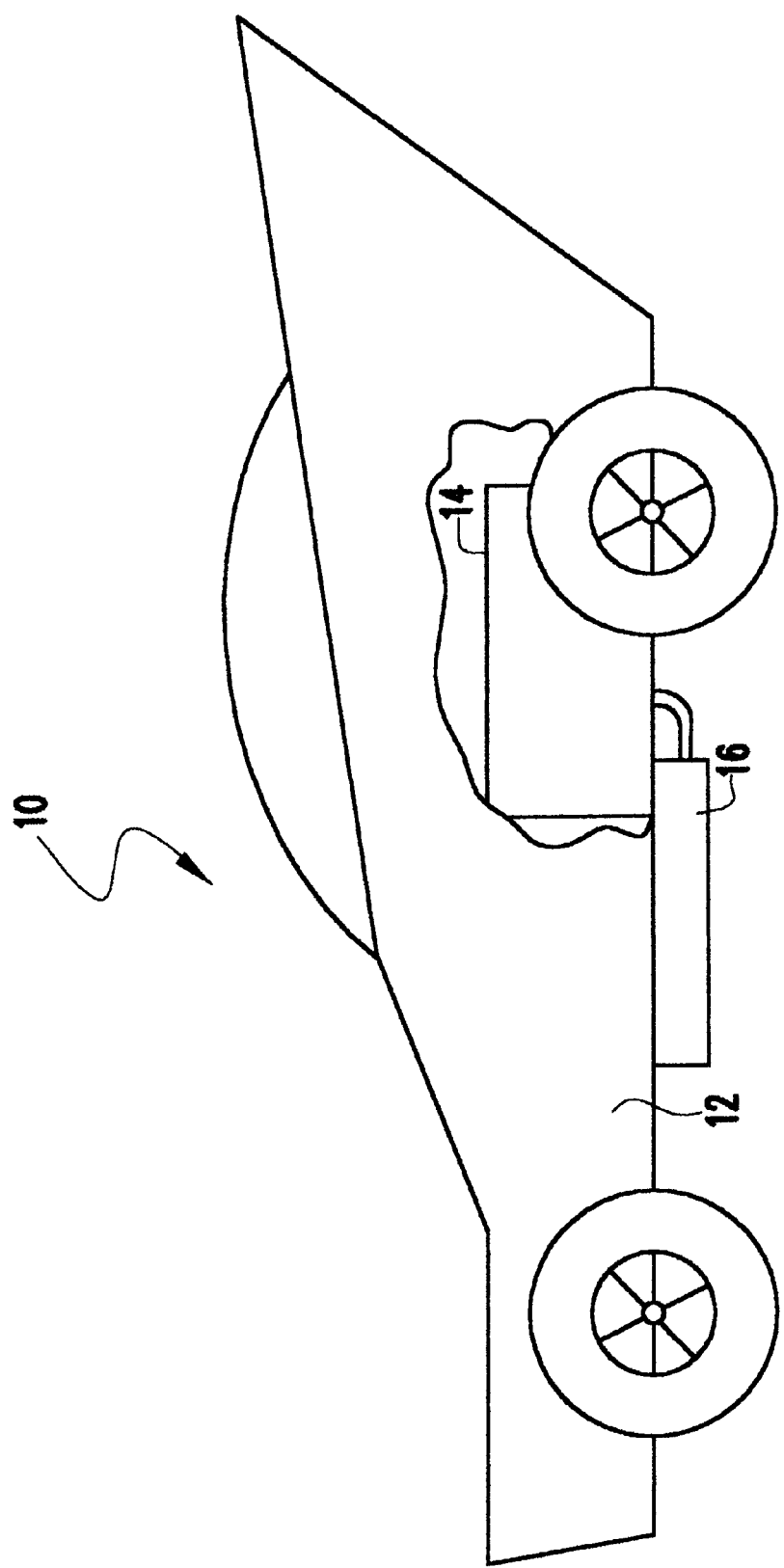
FIG. 1 is a side view of a conventional remote controlled (RC) car with a portion broken away.

Referring now to the drawings, and particularly to FIG. 1, a conventional RC car 10 includes a car frame 12 that supports a motor 14 and a power source 16. The car frame 12 is typically made of a light weight plastic or light weight metal. The motor 14 is preferably mounted on the car frame 12 and connected to the power source 16. The power source 16 is typically a rechargeable battery, including, but not limited to, one manufactured by Sanyo Energy Corporation, or a plurality of rechargeable batteries electrically connected in series. Depending on the requirements of the motor 14, the power source 16 has a pre-determined voltage output and a pre-determined current output. The power source 16 and the motor 14 are electrically connected to each other by a pair of connectors, including but not limited to connectors manufactured by Tamiya Corporation.

Figure 2:
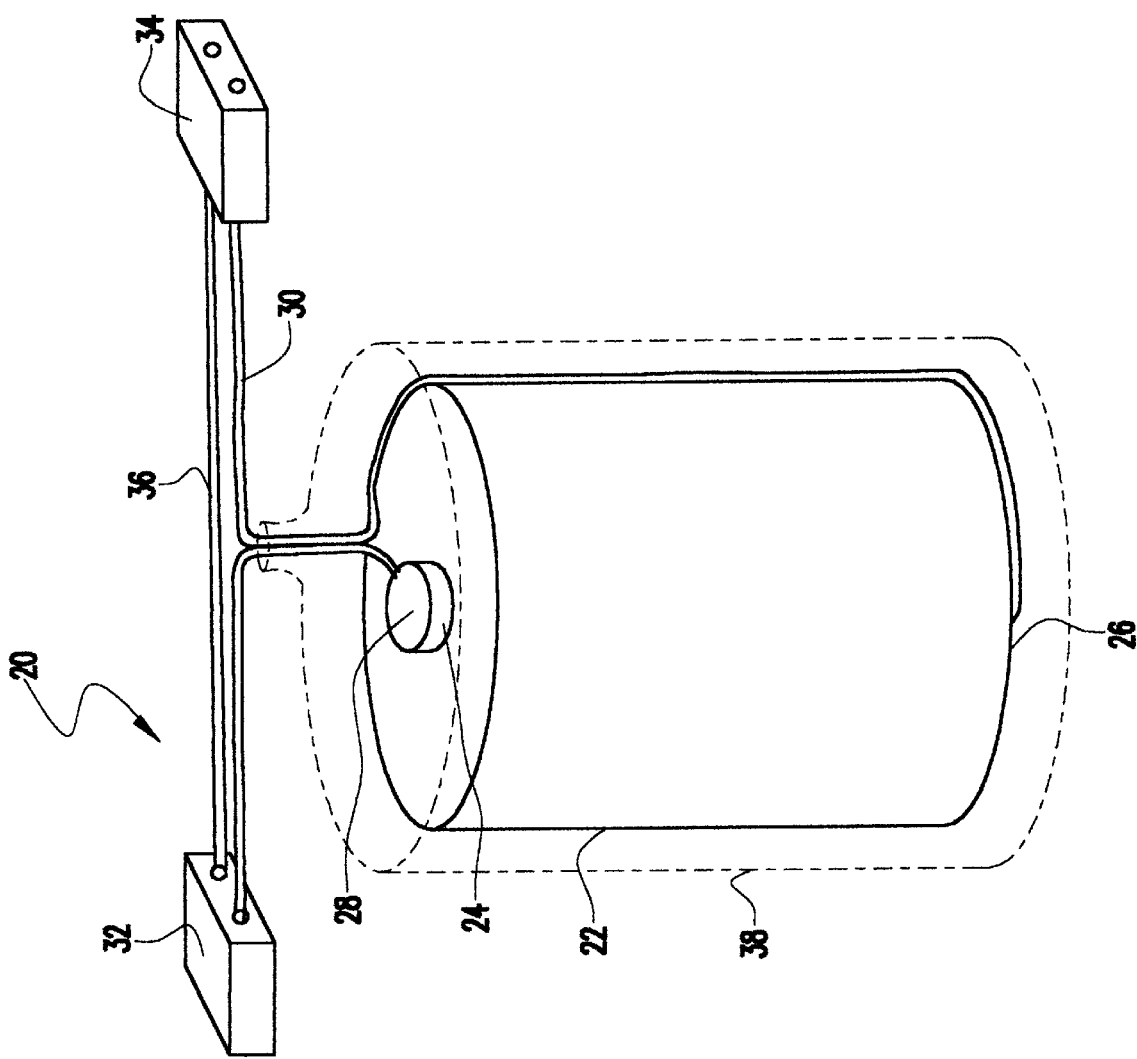
FIG. 2 is an isometric view of a supplemental power cell in accordance with the present invention with encapsulation indicated in broken lines.

FIG. 2 is an isometric view of a supplemental power cell apparatus 20, having a rechargeable power cell 22, leads for coupling the power cell between the power source 16 (FIG. 1) and the motor 14 (FIG. 1) and means for removably securing the supplemental power cell 20 to the RC car 10 (FIG. 1). The rechargeable power cell 22 includes a anode 24 and an cathode 26 that provide physical contacts for conducting electrical current. The rechargeable power cell 22 has an electrical potential and provides an electrical current to the RC car 10. Cell 22 preferably has an electrical potential of about 1.2 volts (V) and provides an electrical current of about 1700 milliamperes (mA). In a preferred embodiment of the present invention, the rechargeable power cell 22 is a conventional sealed rechargeable battery, for example, a 1.2 V, 1700 mA, "C" size nickel cadmium battery. In an alternative embodiment, the rechargeable power cell 22 may be a lithium battery or a nickel metal hydride battery.

The coupling leads include a anode lead 28 connected to the anode 24, an cathode lead 30 connected to the cathode 26, a first connector 32 that receives the anode lead 28, a second connector 34 that receives the cathode lead 30 and a tie lead 36 for connecting the first connector 32 to the second connector 34. The anode lead 28 is attached to the anode 24 and the cathode lead 30 is attached to the cathode 26 by conventional welding techniques. In an alternative embodiment, the anode lead 28 is attached to the anode 24 and the cathode lead 30 is attached to the cathode 26 by conventional soldering techniques. For example, Kwik-Draw Rosin Core 60%/40% Tin/Lead solder, manufactured by Litton Kester Solder Co., is used to attach the leads 28, 30 to the anode 24 and cathode 30, respectively.

The anode lead 28, the cathode lead 30 and the tie lead 36 are electrical wire, preferably 18 gauge, American Wire Gauge (AWG) standard. The anode lead 28, the cathode lead 30 and the tie lead 36 are short in length, preferably within the range from about 1 inch to about 3 inches. The connectors 32, 34 each have a wire engaging portion and a connecting portion. The anode lead 28 terminates in the wire engaging portion of the first connector 32, and the cathode lead 30 terminates in the wire engaging portion of the second connector 34. The tie lead 36 interconnects the wire engaging portion of the first connector 32 to the wire engaging portion of the second connector 34. The first connector 32 conducts electrical current towards the power cell 22, while the second connector 34 conducts electrical current away from the power cell 22. The connectors 32, 34 are preferably Tamiya connectors used in conventional RC cars. In an alternative embodiment, the connectors 32, 34 may be Deans connectors manufactured by W.S. Deans Co.

In a preferred embodiment of the present invention, the first connector 32 conducts electrical current from the primary power source 16 of the RC car to the power cell 22, while the second connector 34 conducts electrical current from the power cell 22 to the motor 14 of the RC car 10. In this configuration, the electrical potential of the power cell 22 is added in series with the electrical potential of the power source 16 of the RC car 10.

The coupling device may also include a power cell housing 38. The power cell housing 38 contains the power cell 22 and at least a portion of the coupling device in order to provide the power cell 22 with a protective barrier from electrical interference and corrosive elements originating from the environment. The power cell housing 38 is formed around the power cell 22, at least a portion of the anode lead 28 and at least a portion of the cathode lead 30. The power cell housing 38 is preferably a non-rigid film made of vinyl or other thermoformable plastic material that is sealed by conventional lamination methods. In another embodiment of the present invention, the power cell housing 38 is a rigid, thermoplastic shell that encases the power cell 22 and may extend from the power cell 22 to encase at least a portion of the anode lead 28 and at least a portion of the cathode lead 30.

Figure 3:
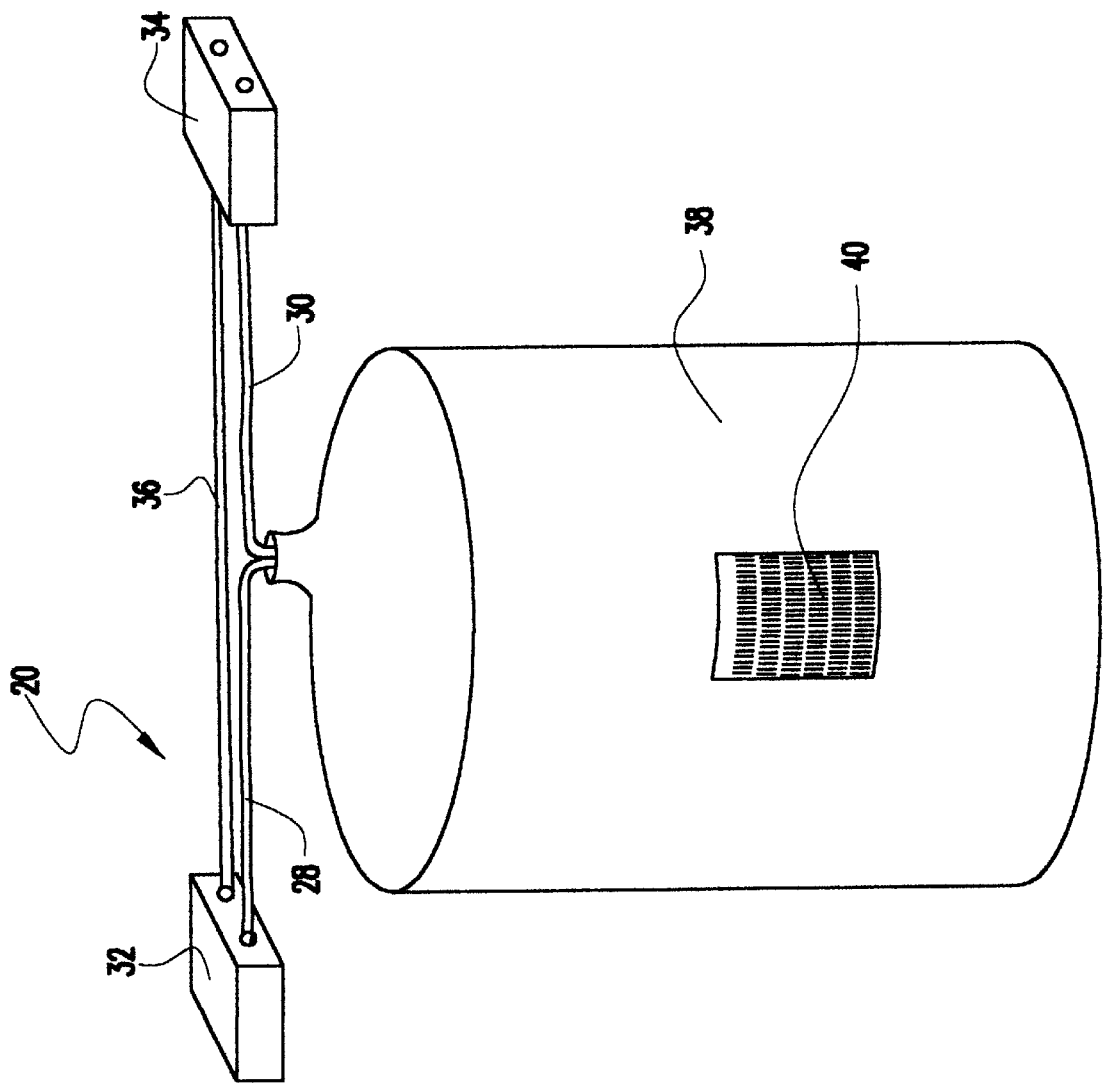
FIG. 3 is an isometric view of the embodiment of FIG. 2 a supplemental power cell in accordance with the present invention showing full encapsulation and a securing apparatus thereon.
Figure 4:
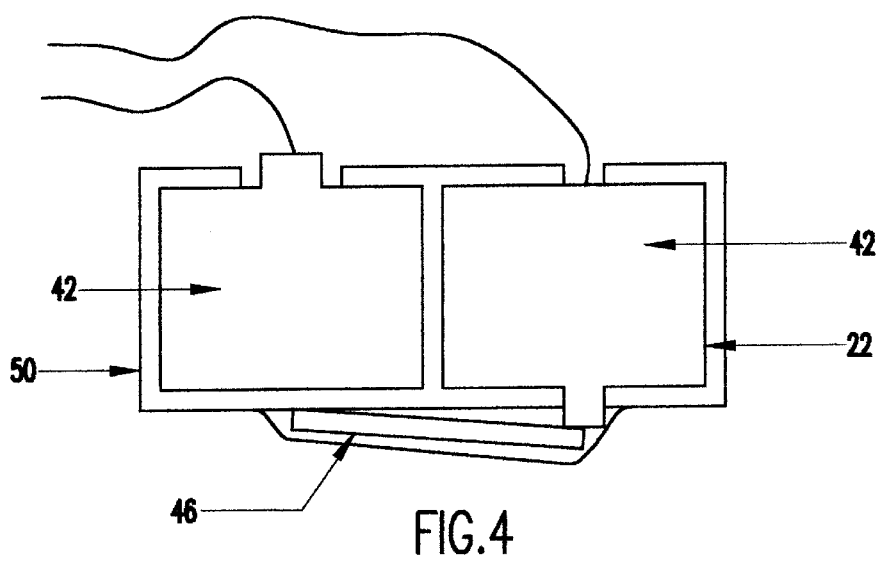
FIG. 4 is an isometric view of a supplemental power cell in accordance with the present invention having two batteries showing full encapsulation.
Figure 5:
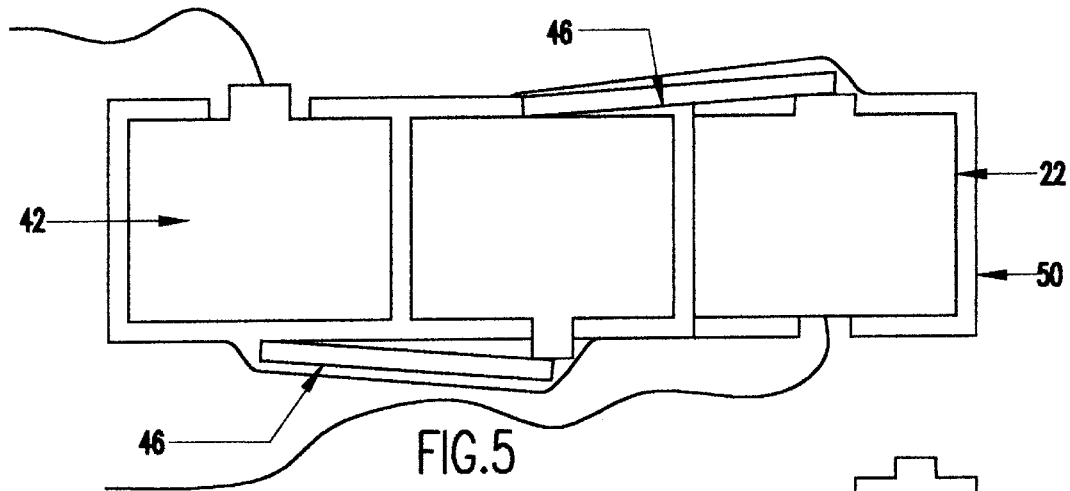
FIG. 5 is an isometric view of a supplemental power cell in accordance with the present invention having three batteries showing full encapsulation.

FIG. 3 is an isometric view of a supplemental power cell in accordance with an alternative embodiment of the present invention. The securing means includes a first portion 40 that is securable to a second portion (not shown) and is preferably a hook and loop fastener such as a VELCRO® fastener. The first portion 40 is fixed to the power cell housing 38 and the second portion is fixed to the RC vehicle at any convenient location on the car frame 12. The second portion of the securing means is preferably fixed to the RC vehicle so that when the supplemental power cell 20 is connected to the power source 16 and the motor 14, the supplemental power cell 20 does not interfere with the movement and control of the RC car 10. The first portion 40 may be affixed to the power cell housing 38 by an adhesive and the second portion may be affixed to the car frame 12 by an adhesive in a similar fashion as the first portion 40. In an alternative embodiment of the invention, the first portion 40 and the second portion may be formed with the power cell housing 38 and the car frame 12, respectively. The securing means withstands vibrations and other forces encountered by the RC car as it traverses a course to temporarily secure the supplemental power cell 20 to the car frame 12.

By using the supplemental power cell 20 with the power source 16 of the RC car, the maximum speed of the RC car is significantly increased without impairing the performance of the RC car. In operation, the supplemental power cell 20 minimally increases resistive heat that is generated by the addition of the supplemental power cell 20.

ALTERNATIVE EMBODIMENTS

Although the power cell 22 is described in the context of a single "C" size, 1.2 V, 1700 mA, rechargeable battery, a plurality of rechargeable batteries may be used. For example, a pair of "C" size, 1.2 V, 1700 mA rechargeable batteries 42 may be connected 46 to each other in series to provide a power cell 22 having 2.4 V, 1700 mA, properties and encapsulated 50. The plurality of batteries can be bunched, stacked, or side-by-side.

Figure 6:
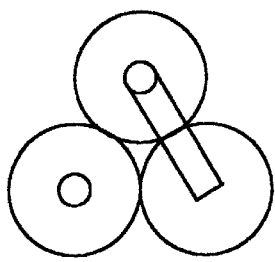
FIG. 6 is a top view of a supplemental power cell in accordance with the present invention having three batteries bunched together, full encapsulation not shown.
Figure 7:
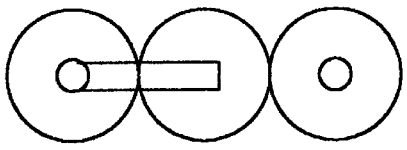
FIG. 7 is a top view of a supplemental power cell in accordance with the present invention having three batteries side-by-side, full encapsulation not shown.
Figure 8:
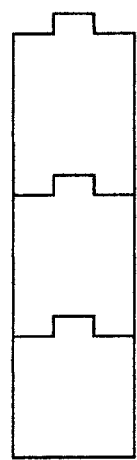
FIG. 8 is a side view of a supplemental power cell in accordance with the present invention having three batteries in a stacked configuration, full encapsulation not shown.

The power cell 22 can be further expanded to three single "C" size, 1.2 V, 1700 mA, rechargeable batteries 42 connected 46 to each other in series to provide a power cell 22 having a 3.6V, 1700 mA, properties and encapsulated 50. The three battery configuration can be arranged either by bunching the batteries together as in FIG. 6, side-by-side as shown in FIG. 7, or stacked as shown in FIG. 8.

The power cell 22 can be further expanded to four single "C" size, 1.2 V, 1700 mA, rechargeable batteries 42 connected to each other in series to provide a power cell 22 having a 4.8V, 1700 mA, properties and encapsulated 50. The four battery configuration can be arranged either side-by-side as shown in FIG. 10, bunched together as shown in either FIG. 11 or 12, or stacked as shown in FIG. 13. Although not shown, but the batteries can be stacked four high if necessary.

EXAMPLE

A supplemental power cell is manufactured using a 1.2 V, 1700 mA nickel cadmium rechargeable battery. The supplemental power cell is added in series with an original RC power source, a 7.2 V rechargeable battery pack, and connected to an original motor in an RC race car. The RC race car was raced along an 80 foot straight track and times were recorded for trials of the RC race car without using the supplemental power cell and for trials of the RC race car using the supplemental power cell. Table 1 shows the results of the trials.

TABLE 1

|  | Trial 1 | Trial 2 | Trial 3 |
|---|---|---|---|
| with power cell | 3.56 sec | 3.75 sec | 3.62 sec |
| without power cell | 4.95 sec | 4.85 sec | 4.86 sec |

The average improvement in time for the RC race car to travel the 80 foot track is about 25%. This decrease in time for the RC race car to travel the 80 foot track, as a consequence of using the supplemental power cell, results in an increase in average velocity of about 30%.

SUMMARY OF THE ACHIEVEMENT OF THE OBJECTS OF THE INVENTION

From the foregoing, it is readily apparent that I have invented an apparatus that increases the top-end speed of an RC vehicle with a minimal cost and effort to the enthusiast. The present invention provides a supplemental power cell that increases the top-end speed of an RC vehicle and that can be coupled to an existing RC vehicle power supply with minimal cost and effort to the hobby enthusiast. The present invention provides a supplemental power cell that increases the top-end speed of an RC vehicle, minimally modifies the original configuration of the RC vehicle and does not negatively interfere with the performance of the RC vehicle.

It is to be understood that the foregoing description and specific embodiments are merely illustrative of the best mode of the invention and the principles thereof, and that various modifications and additions may be made to the apparatus by those skilled in the art, without departing from the spirit and scope of this invention.

What is Claimed is:

1. A power cell for supplementing a power source in a remote controlled (RC) vehicle connected to a motor, the power cell comprising:

at least one battery having a cathode and an anode;

a cathode lead connected to said cathode for conducting electrical current;

an anode lead connected to said anode for conducting electrical current;

a power cell housing for encasing said at least one battery, at least a portion of said cathode lead and at least a portion of said anode lead;

a first connector for coupling said power cell with a primary battery for the remote controlled vehicle, said cathode lead terminating in said first connector;

a second connector for coupling said power cell with said motor, said anode lead terminating in said second connector;

a tie lead interconnecting said first connector and said second connector for conducting electrical current; and means for removably securing the power cell to the RC vehicle.

2. A power cell according to claim 1 wherein said power cell housing is made of a non-rigid material.

3. A power cell according to claim 1 wherein said power cell housing is made of a pliable heat shrinkage wrap material.

4. A power cell according to claim 1 wherein said battery is a nickel cadmium battery.

5. A power cell according to claim 1 wherein said at least one battery has an electrical potential of about 1.2 V to 4.8 V.

6. A power cell according to claim 1 wherein said means for removably securing is a hook and loop fastener.

7. A power cell according to claim 1 wherein said cathode lead, said anode lead and said tie lead comprise electric wire in the range of 14 to 18 gauge AWG.

8. A supplemental power cell for use in a remote control (RC) car having a motor, a car frame and a power source, the supplemental power cell comprising:

at least one battery having an anode and a cathode;

a power cell housing for encasing said at least one battery, at least a portion of a cathode lead and at least a portion of an anode lead;

means for coupling the power cell to the power source and the motor, said means for coupling connected to said anode and said cathode of said battery comprises;

a cathode lead connected to said cathode;

an anode lead connected to said anode;

a first connector for conducting electrical current from a power source to said primary battery, said first connector receiving said cathode lead;

a second connector for conducting electrical current from said power source to the motor of the RC car, said second connector receiving said anode lead;

a tie lead interconnecting said first connector and said second connector; and means for removably securing the power cell to the RC car.

9. A supplemental power cell according to claim 8 wherein said power cell housing is made of a non-rigid material.

10. A supplemental power cell according to claim 8 wherein said power cell housing is made of a pliable heat shrinkage wrap material.

11. A supplemental power cell according to claim 8 wherein said at least one battery is a rechargeable nickel cadmium battery.

12. A supplemental power cell according to claim 8 wherein said at least one battery has an electrical potential of about 1.2 V to 4.8 V.

13. A supplemental power cell according to claim 8 wherein said securing means is a hook and loop fastener with a first portion fixedly attachable to said power cell housing; and a second portion fixedly attachable to the car frame.

14. A supplemental power cell according to claim 8 wherein said cathode lead, said anode lead and said tie lead comprise electrical wire in the range of 14 to gauge AWG.

* * * * *